United States Patent
Ogawa

(10) Patent No.: US 12,134,398 B2
(45) Date of Patent: Nov. 5, 2024

(54) VEHICLE-MOUNTED DEVICE, CONTROL METHOD THEREFOR, AND VEHICLE

(71) Applicant: SUMITOMO ELECTRIC INDUSTRIES, LTD., Osaka (JP)

(72) Inventor: Akihiro Ogawa, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 292 days.

(21) Appl. No.: 17/616,423

(22) PCT Filed: Jun. 19, 2020

(86) PCT No.: PCT/JP2020/024193
§ 371 (c)(1),
(2) Date: Dec. 3, 2021

(87) PCT Pub. No.: WO2021/002223
PCT Pub. Date: Jan. 7, 2021

(65) Prior Publication Data
US 2022/0250640 A1 Aug. 11, 2022

(30) Foreign Application Priority Data
Jul. 1, 2019 (JP) ................. 2019-122834

(51) Int. Cl.
*B60W 60/00* (2020.01)
*H04W 4/44* (2018.01)

(52) U.S. Cl.
CPC .............. *B60W 60/00* (2020.02); *H04W 4/44* (2018.02); *B60W 2556/45* (2020.02)

(58) Field of Classification Search
CPC .................................................... B60W 60/00
See application file for complete search history.

(56) References Cited

U.S. PATENT DOCUMENTS

| | | | |
|---|---|---|---|
| 9,734,169 B2 * | 8/2017 | Redlich | G06F 16/21 |
| 2013/0304761 A1 * | 11/2013 | Redlich | G06F 16/21 |
| | | | 707/781 |

(Continued)

FOREIGN PATENT DOCUMENTS

| | | | |
|---|---|---|---|
| CN | 109983306 B | * | 9/2017 |
| CN | 109466474 A | | 3/2019 |

(Continued)

OTHER PUBLICATIONS

Lan, Cuiling, et al., Compound Image Compression Using Lossless and Lossy LZMA in HEVC, Microsoft Research Asia, 2University of Science and Technology of China, IEEE, (https://ieeexplore.ieee.org/stamp/stamp.jsp?tp=&arnumber=7177430) (hereinafter "Lan").*

(Continued)

*Primary Examiner* — Jean Paul Cass
(74) *Attorney, Agent, or Firm* — Oliff PLC

(57) ABSTRACT

An on-vehicle device includes: a driving support device to receive driving support information from a driving support server and execute a predetermined process for driving support; a sub driving support server including a driving support server function subset and receives sensor data from an external sensor and output a subset of the driving support information; a first switching device giving the subset of the driving support information to the driving support device in response to interruption of reception of the driving support information from the driving support server; and a second switching device configured to give the driving support information from the driving support server, instead of the subset of the driving support information from the sub driving support server, to the driving support device in response to recovery of the reception of the driving support information from the driving support server.

8 Claims, 9 Drawing Sheets

(56) References Cited

U.S. PATENT DOCUMENTS

2017/0262277 A1* 9/2017 Endo .................. G06F 8/658
2019/0018410 A1   1/2019 Ando
2019/0239155 A1   8/2019 Ushida et al.

FOREIGN PATENT DOCUMENTS

| CN | 115904425 A | * | 4/2023 | ............ B60W 50/06 |
| CN | 116032957 A | * | 4/2023 | ............ B60W 60/00 |
| JP | H05-006318 A | | 1/1993 | |
| JP | 2001-147925 A | | 5/2001 | |
| JP | 2005111300 A | * | 4/2005 | |
| JP | 2005337744 A | * | 12/2005 | |
| JP | 2013003049 A | * | 1/2013 | ............ G01C 21/34 |
| JP | 2016-036067 A | | 3/2016 | |
| JP | 2017-167646 A | | 9/2017 | |
| JP | 2018-018284 A | | 2/2018 | |
| JP | 2019-020782 A | | 2/2019 | |

OTHER PUBLICATIONS

Machine translation of JP2005337744A to Mimura (2004).*
Google Machine translation of CN2768330Y (Year: 2005).*
Liu et al.; "Edge Computing for Autonomous Driving: Opportunities and Challenges;" Proceedings of the IEEE; 2019; pp. 1697-1716; vol. 107, No. 8.

* cited by examiner

VEHICLE-MOUNTED DEVICE, CONTROL METHOD THEREFOR, AND VEHICLE

TECHNICAL FIELD

This disclosure relates to an on-vehicle device, a control method therefor, and a vehicle. This application claims priority on Japanese Patent Application No. 2019-122834 filed on Jul. 1, 2019, the entire content of which is incorporated herein by reference.

BACKGROUND ART

A system, in which various sensors are mounted on a vehicle, sensors for infrastructure equipment (hereinafter, referred to as "infrastructure sensors") are installed on the roadside, etc., and sensor data from these sensors is integrated and analyzed by a server and used for driving support, is becoming prevalent. In such a system, the vehicle connects to a nearby wireless base station by using wireless communication, and performs communication with the server via this wireless base station.

In the case of a driving support system, delay due to communication becomes a problem. For the purpose of reducing delay of wireless communication between a vehicle and a server, a server is installed near the site where a vehicle travels, and sensor data is processed by this server. This server is called an edge server in the sense that the server is installed near the site.

Where to install the edge server depends on the design concept, but it is considered efficient to install the edge server in the vicinity of a wireless base station (mobile edge).

With reference to FIG. 1, a driving support system 50 disclosed in PATENT LITERATURE 1 described below includes, for example, wireless base stations 60, 64, and 68 which cover different areas 110, 112, and 114 of one major road, respectively, and edge servers 62, 66, and 70 which are installed at positions close to these wireless base stations 60, 64 and 68, respectively, and which are connected to the wireless base stations 60, 64 and 68, respectively. The wireless base stations 60, 64, and 68 are connected to a backbone network (core network) 82 by a backhaul 80.

For example, the wireless base station 60 and the wireless base station 68 are connected to the backhaul 80 by an optical fiber 120 and an optical fiber 124, respectively. Meanwhile, the wireless base station 64 is connected to a metal wire 122. Furthermore, the backhaul 80 is connected to the wider core network 82 by an optical fiber 126. Moreover, the core network 82 is connected to servers and wireless base stations that exist in a wide range, by optical fibers 128 and 130.

A camera 90 and a LiDAR (light detection and ranging) 92 are provided at an intersection in the area 110, a camera 94 and a LiDAR 96 are provided at an intersection in the area 112, and a camera 98 and a LiDAR 100 are provided at an intersection in the area 114. At the edge servers 62, 66, and 70, driving support servers that process sensor data transmitted from these cameras and LiDARs and vehicles existing in the areas 110, 112, and 114 are operating, respectively. Driving support information from each driving support server is transmitted from the edge servers 62, 66, and 70 to each vehicle via the wireless base station 60, the wireless base station 64, the wireless base station 68, etc.

For example, in the technology disclosed in PATENT LITERATURE 1, a vehicle 140 existing in the area 110 connects to the wireless base station 60 by wireless communication 102. The vehicle 140 further communicates with the edge server 62, which is provided near the wireless base station 60, via the wireless base station 60, and receives driving support information.

CITATION LIST

Patent Literature

PATENT LITERATURE 1: Japanese Laid-Open Patent Publication No. 2018-18284

SUMMARY OF INVENTION

Solution to Problem

An on-vehicle device according to a first aspect of this disclosure includes: a driving support device configured to receive driving support information from a driving support server and execute a predetermined process for driving support; a sub driving support server including a subset of a function of the driving support server and configured to receive sensor data from an external sensor and output a subset of the driving support information; a first switching device configured to give the subset of the driving support information from the sub driving support server, instead of the driving support information from the driving support server, to the driving support device in response to interruption of reception of the driving support information from the driving support server; and a second switching device configured to give the driving support information from the driving support server, instead of the subset of the driving support information from the sub driving support server, to the driving support device in response to recovery of the reception of the driving support information from the driving support server.

A vehicle according to a second aspect of this disclosure includes the on-vehicle device described above and a vehicle control device to be supported by the driving support device.

A control method for an on-vehicle device according to a third aspect of this disclosure includes the steps of: receiving driving support information from a driving support server and executing a predetermined process for driving support; including a subset of a function of the driving support server, receiving sensor data from an external sensor, and starting a sub driving support server configured to output a subset of the driving support information; giving the subset of the driving support information from the sub driving support server, instead of the driving support information from the driving support server, to the driving support device in response to interruption of reception of the driving support information from the driving support server; and giving the driving support information from the driving support server, instead of the subset of the driving support information from the sub driving support server, to the driving support device in response to recovery of the reception of the driving support information from the driving support server.

The objects, features, and advantages of this disclosure will become apparent from this specification and the accompanying drawings.

DESCRIPTION OF EMBODIMENTS

Figure 1:
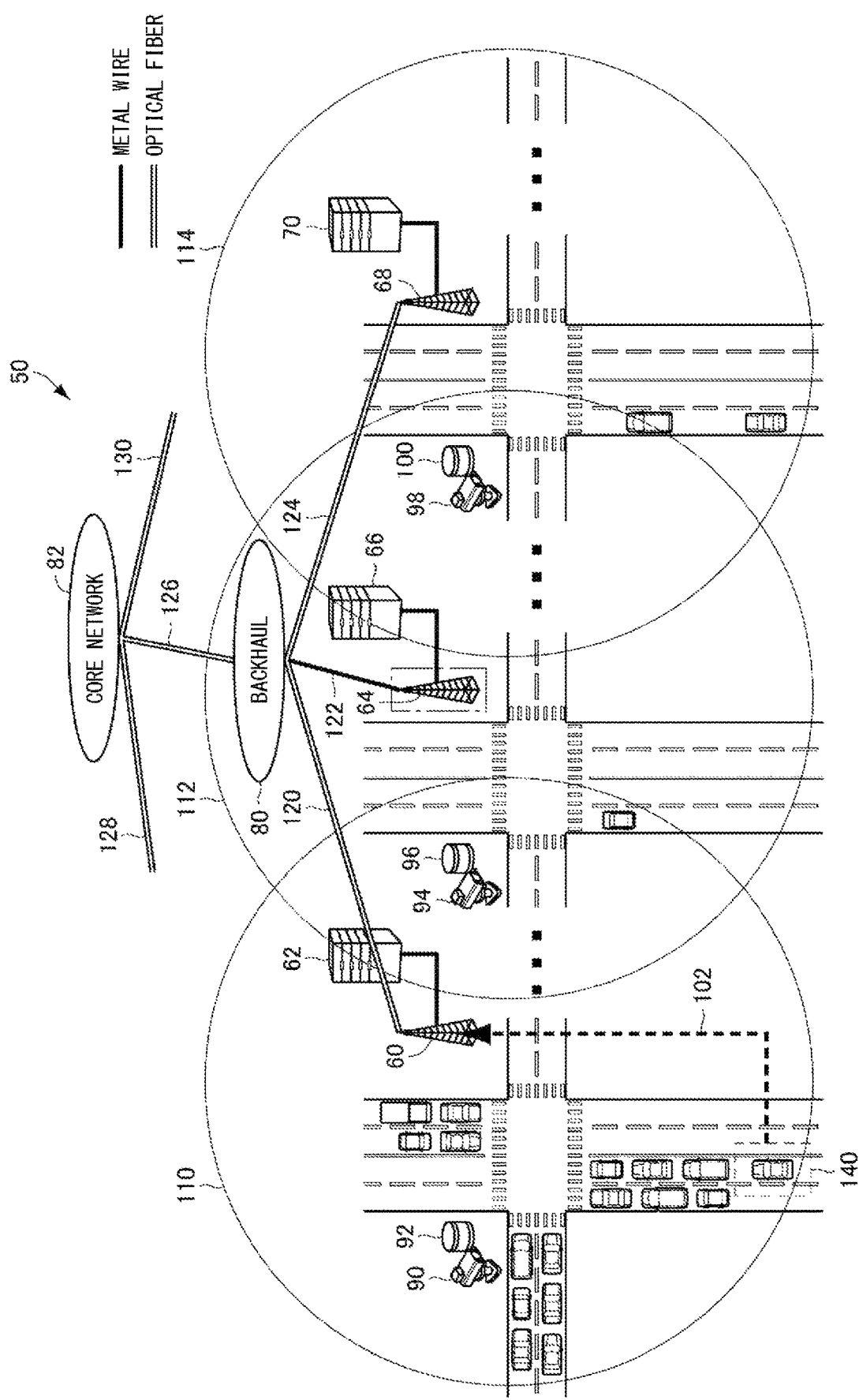
FIG. 1 is a schematic configuration diagram of a driving support system including a conventional on-vehicle device.

Problems to be Solved by the Disclosure

However, in such a system, when, for some reason, the vehicle 140 cannot communicate with the edge server 62, there is a problem that even if the vehicle 140 has a driving support device, the driving support device becomes useless. It is also conceivable to connect to the other edge server 66 or 70, or the like. However, the areas 112 and 114 managed by these edge servers are far from the region where the vehicle 140 exists, and even if the vehicle 140 successfully receives driving support information from these edge servers, the driving support information is highly likely to be useless for the vehicle 140.

Even if the camera 90 and the LiDAR 92 are present near the vehicle 140, there is a problem that the vehicle 140 cannot use sensor data therefrom and cannot receive sufficient driving support.

Therefore, an object of this disclosure is to provide an on-vehicle device, a control method therefor, and a vehicle that can use driving support information even when connection to an edge server cannot be made.

Effects of the Disclosure

As described above, according to this disclosure, it is possible to provide an on-vehicle device, a control method therefor, and a vehicle that can use driving support information even when connection to an edge server cannot be made.

DESCRIPTION OF EMBODIMENTS OF THIS DISCLOSURE

In the description below and the drawings, the same components are denoted by the same reference signs. Therefore, detailed descriptions thereof are not repeated. At least some parts of the disclosure described below may be combined together as desired.

(1) An on-vehicle device according to a first aspect of this disclosure includes: a driving support device configured to receive driving support information from a driving support server and execute a predetermined process for driving support; a sub driving support server including a subset of a function of the driving support server and configured to receive sensor data from an external sensor and output a subset of the driving support information; a first switching device configured to give the subset of the driving support information from the sub driving support server, instead of the driving support information from the driving support server, to the driving support device in response to interruption of reception of the driving support information from the driving support server; and a second switching device configured to give the driving support information from the driving support server, instead of the subset of the driving support information from the sub driving support server, to the driving support device in response to recovery of the reception of the driving support information from the driving support server.

When the reception of the driving support information from the driving support server is interrupted, the subset of the driving support information outputted by the sub driving support server is given to the driving support device by the first switching device. Even when the driving support information is not obtained, the driving support device operates using the subset of the driving support information. As a result, it is possible to provide an on-vehicle device that can use the driving support information even when connection to the edge server cannot be made.

(2) The sub driving support server of the on-vehicle device may include a computer and a storage device for storing a program to be executed by the computer, and the on-vehicle device further may include an installer for installing a program for realizing the sub driving support server in the computer, into the storage device in response to an installation instruction from the sub driving support server.

The sub driving support server includes a computer and a storage device, and is installed into the on-vehicle device in response to an installation instruction. By installing the sub driving support server into the computer, the on-vehicle device functions as an on-vehicle device that can use the driving support information even when connection to the edge server cannot be made.

(3) The on-vehicle device further may include a server reconstruction device for reconstructing the sub driving support server at a predetermined time interval.

The sub driving support server is reconstructed at a predetermined time interval. As a result, the sub driving support server can provide a subset of the latest driving support information at a predetermined time interval.

(4) The on-vehicle device further may include: a state storage device for storing states inside and outside the on-vehicle device and a cooperative state with another sensor-equipped device on the basis of the driving support information; and a server reconstruction device for reconstructing the sub driving support server in response to a change in either the states inside and outside the on-vehicle device or the cooperative state with the other sensor-equipped device storaging the state storage device.

The sub driving support server is reconstructed when either the states inside and outside the on-vehicle device or the cooperative state with the other sensor-equipped device changes. As a result, the sub driving support server can provide a subset of the latest driving support information in accordance with a change in the surrounding environment.

(5) The on-vehicle device further may include a background processing execution device for starting the sub driving support server with start of the on-vehicle device and cause the sub driving support server to operate in background of the reception of the driving support information from the driving support server.

The sub driving support server is executed in the background. Therefore, even when the driving support information distributed from the driving support server is no longer received, switching by the first switching device can be performed seamlessly. The vehicle can continue to receive support by at least the subset of the driving support information.

(6) The sub driving support server may be set not to start when the on-vehicle device is started, and the on-vehicle device further may include a server start device for starting the sub driving support server in response to interruption of the reception of the driving support information from the driving support server.

The sub driving support server does not operate in the background, but is started when the reception of the driving support information from the driving support server is interrupted. When the driving support information can be received from the driving support server, a load due to the sub driving support server is not applied to the on-vehicle device. Therefore, the sub driving support server can be used even by an on-vehicle device having low processing capability.

(7) A vehicle according to a second aspect of this disclosure includes any on-vehicle device described above and a vehicle control device to be supported by the driving support device.

In the vehicle, similar to (1), when the reception of the driving support information from the driving support server is interrupted, the subset of the driving support information outputted by the sub driving support server is given to the driving support device by the first switching device. Even when the driving support information is not obtained, the driving support device can perform driving support using the subset of the driving support information. As a result, it is possible to provide a vehicle that can use the driving support information even when connection to the edge server cannot be made.

(8) A control method for an on-vehicle device according to a third aspect of this disclosure includes the steps of: a computer receiving driving support information from a driving support server and executing a process of giving the driving support information to a driving support device configured to execute a predetermined process for driving support; the computer including a subset of a function of the driving support server, receiving sensor data from an external sensor, and starting a sub driving support server configured to output a subset of the driving support information; the computer starting a process of giving the subset of the driving support information from the sub driving support server, instead of the driving support information from the driving support server, to the driving support device in response to interruption of reception of the driving support information from the driving support server; and the computer restarting a process of giving the driving support information from the driving support server, instead of the subset of the driving support information from the sub driving support server, to the driving support device in response to recovery of the reception of the driving support information from the driving support server.

According to this method, when the reception of the driving support information from the driving support server is interrupted, the subset of the driving support information outputted by the sub driving support server is given to the driving support device. Even when the driving support information is not obtained, the driving support device can perform driving support using the subset of the driving support information. As a result, it is possible to provide a control method, for an on-vehicle device, in which the driving support information can be used even when connection to the edge server cannot be made.

DETAILS OF EMBODIMENTS OF THIS DISCLOSURE

Hereinafter, specific examples of an on-vehicle device, a control method therefor, and a vehicle according to an embodiment of this disclosure will be described with reference to the drawings. This disclosure is not limited to these examples, is defined by the scope of the claims, and is intended to include meaning equivalent to the scope of the claims and all modifications within the scope. In addition, some parts of the disclosure described below may be combined together as desired.

(Configuration)

Figure 2:
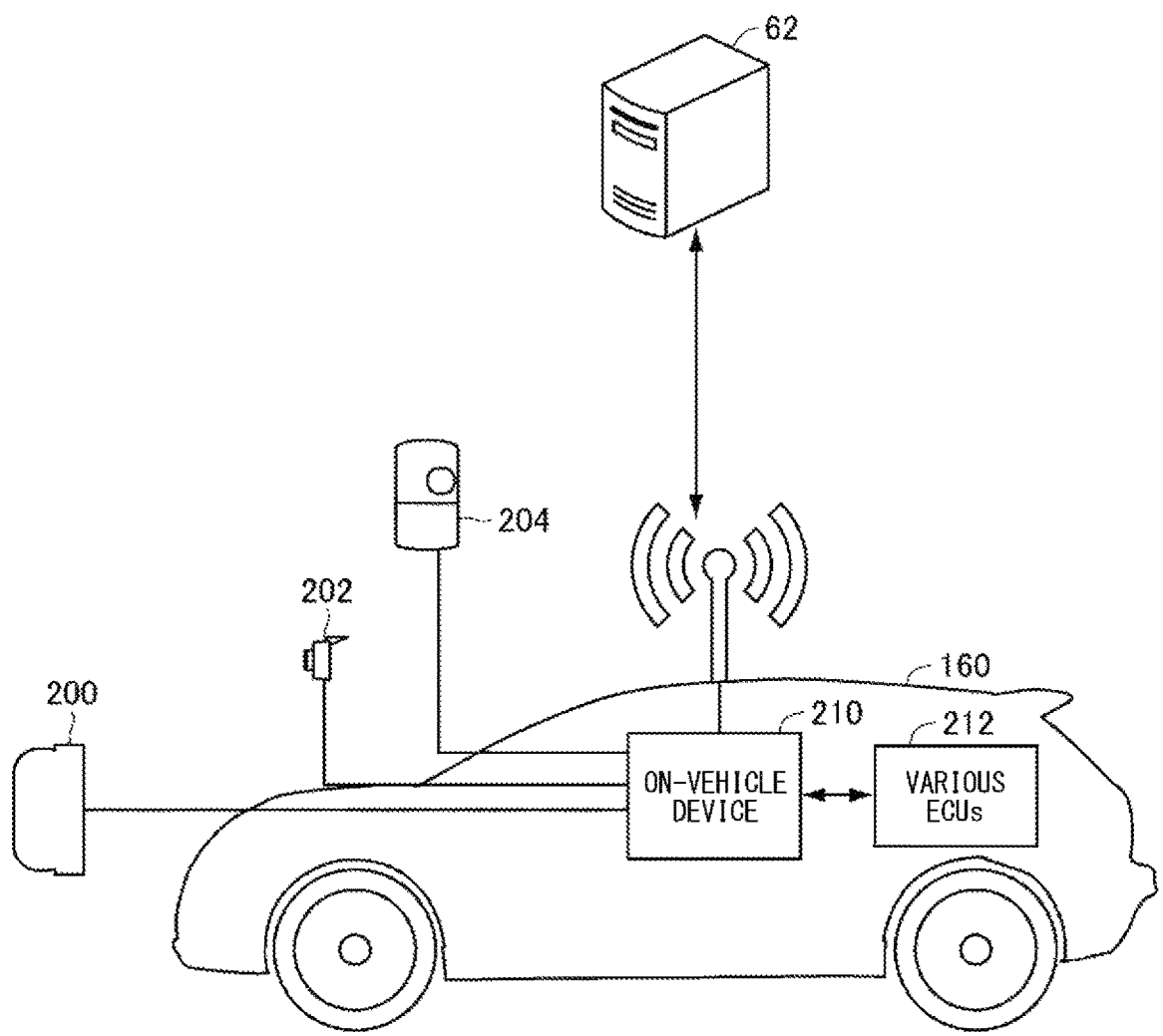
FIG. 2 is a schematic block diagram of an on-vehicle device according to an embodiment of this disclosure and each part of a vehicle controlled by the on-vehicle device.

FIG. 2 shows a schematic configuration diagram of a vehicle 160 according to a first embodiment of this disclosure. With reference to FIG. 2, the vehicle 160 includes: various sensors such as a LiDAR 204, an on-vehicle camera 202, and a millimeter-wave radar 200; an on-vehicle device 210 for collecting sensor data from these sensors and transmitting the sensor data to an edge server by wireless communication; and various ECUs 212 which are controlled by the on-vehicle device 210. The on-vehicle device 210 has the function of a mini edge server as described later. Thus, even when the vehicle 160 cannot receive distribution data from an edge server, the vehicle 160 can enjoy driving support by receiving sensor information from a surrounding node and causing the mini edge server to process the sensor information.

Figure 3:
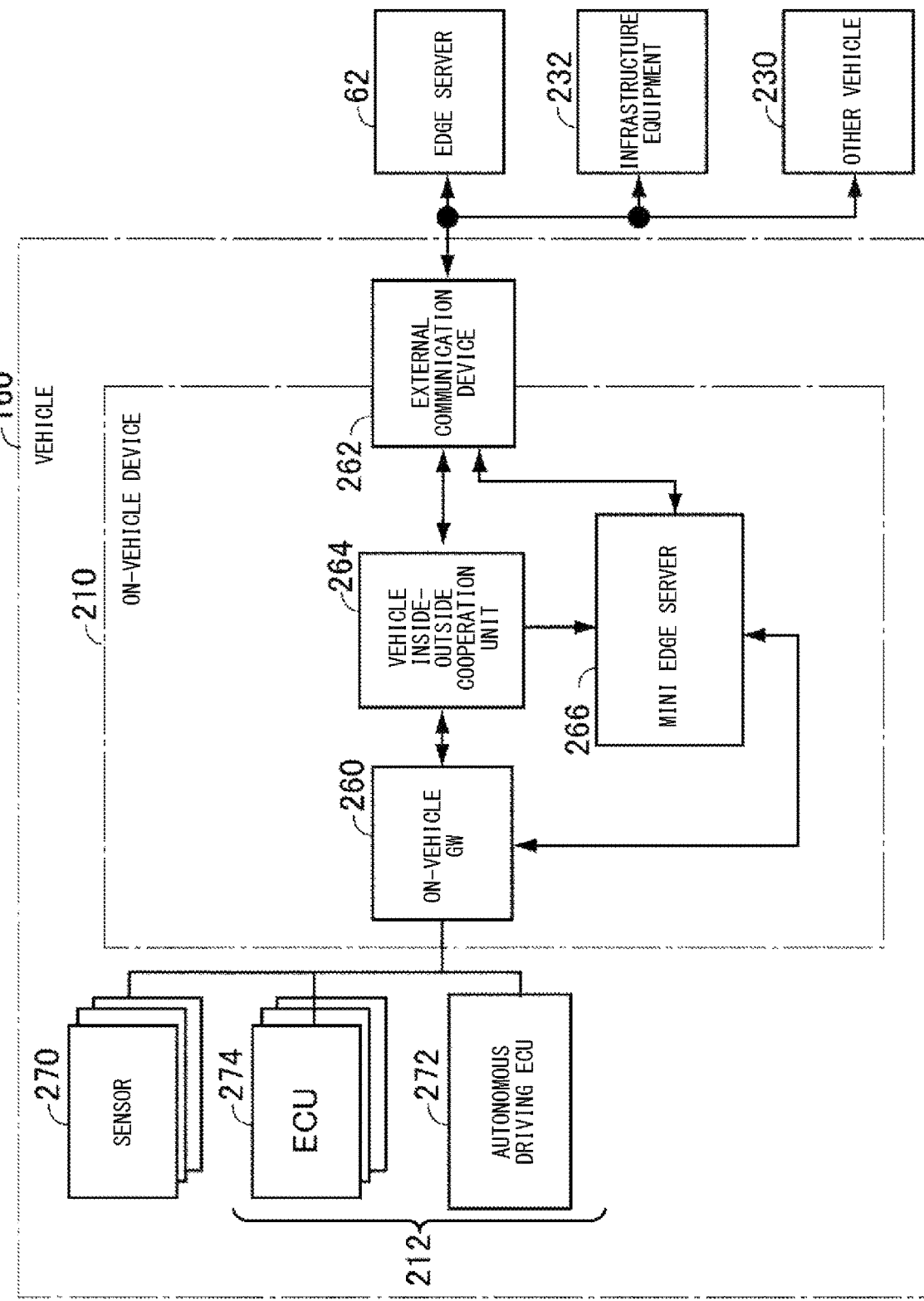
FIG. 3 is a diagram showing an example of connection between the on-vehicle device and an edge server in the embodiment of this disclosure.

FIG. 3 shows a functional configuration of components related to driving support among the components of the vehicle 160, in block diagram format. With reference to FIG. 3, the vehicle 160 includes: the on-vehicle device 210 which performs communication with the edge server 62, infrastructure equipment 232, and another vehicle 230 via wireless communication; various sensors 270 which are connected to the on-vehicle device 210 and which are for giving various sensor data to the on-vehicle device 210; and the various ECUs 212 which are connected to the on-vehicle device 210 and which drive each part of the vehicle 160 in accordance with information given by the on-vehicle device 210.

The various ECUs 212 include an autonomous driving ECU 272 for controlling each part of the vehicle 160 for driving support in accordance with driving support information given from the edge server 62, and various ECUs 274 for controlling each vehicle part for driving support, similarly, in accordance with driving support information given from the edge server 62 and instructions from the driver. The driving support information may include any information that is useful for the subject who drives the vehicle to drive the vehicle safely. Examples of the driving support information are the positions and attributes of dynamic objects that exist in the travelling direction of the vehicle 160 in the traffic environment. The attributes specifically include the classification of objects such as vehicles, pedestrians, and falling objects that exist in the travelling direction of the vehicle 160.

The on-vehicle device 210 includes: an external communication device 262 for performing wireless communication with the outside; and a mini edge server 266 which realizes the function of a subset of the function provided by the edge server 62, on the basis of sensor data collected through communication of some nodes via the external communication device 262, and generates a subset of the driving support information outputted by the edge server 62, as described later. The main function provided by the edge server 62 is collection of sensor data from vehicles and infrastructure sensors and detection of the positions and attributes of dynamic objects in the traffic environment by an analysis process on the sensor data.

The on-vehicle device 210 further includes: an on-vehicle GW (gateway) 260 for switching between and performing communication with the various sensors 270, the autonomous driving ECU 272, and the various ECUs 274 and communication with the edge server 62 or the mini edge server 266 on the basis of whether communication with the edge server 62 is possible; and a vehicle inside-outside cooperation unit 264 which is connected to the external communication device 262 and the on-vehicle GW 260 and which is for performing cooperative processing based on information on the inside and the outside of the vehicle 160.

The on-vehicle GW 260 switches a communication path such that the driving support information from the edge server 62 is given to the autonomous driving ECU 272, the various ECUs 274, etc., when communication with the edge server 62 is possible, but driving support information from the mini edge server 266 is given to the autonomous driving ECU 272, the various ECUs 274, etc., when communication with the edge server 62 becomes impossible. When communication with the edge server 62 is recovered, the on-vehicle GW 260 switches the communication path such that the process of giving the driving support information from the edge server 62, to the autonomous driving ECU 272, the various ECUs 274, etc., is restarted.

Figure 4:
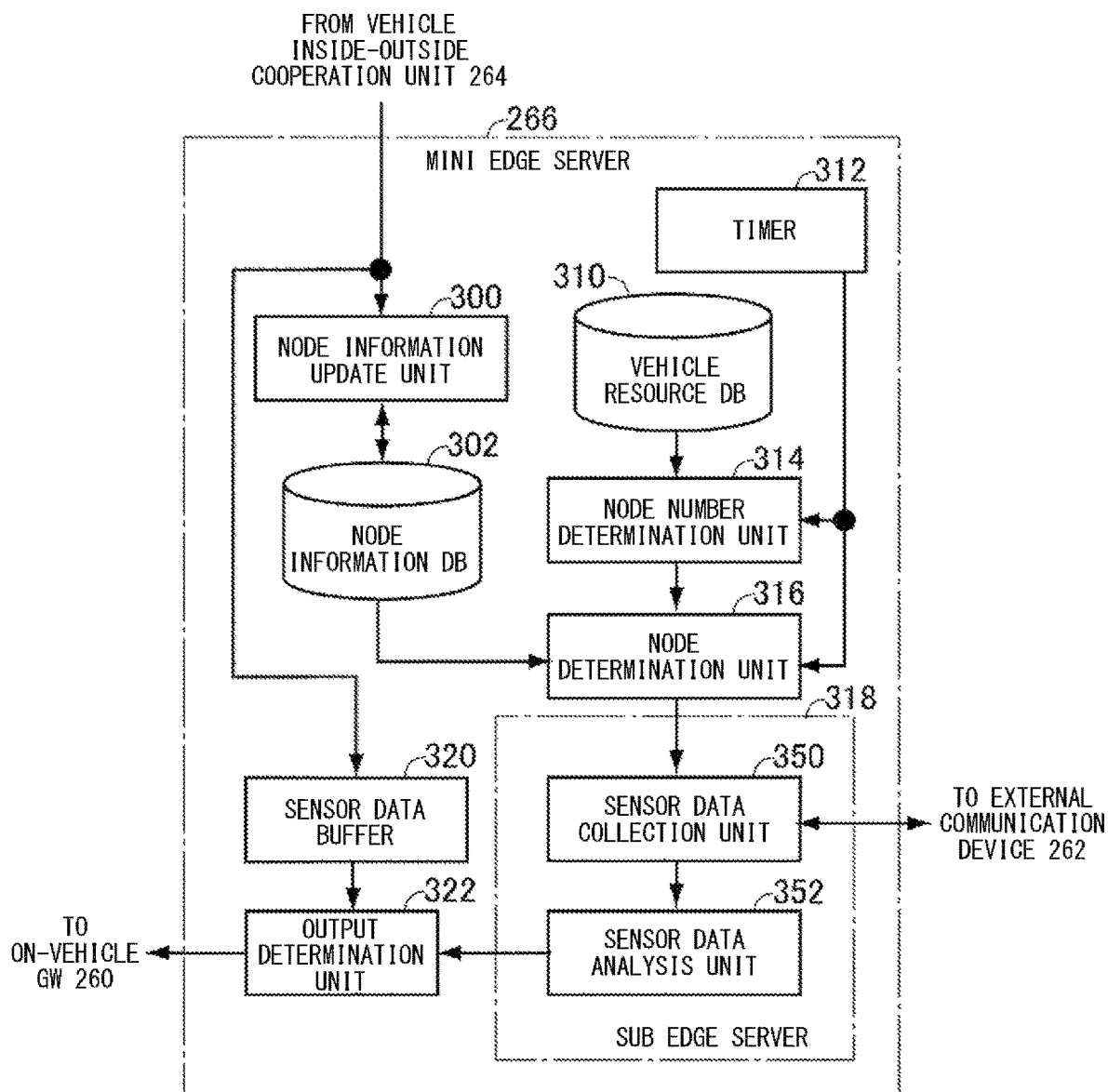
FIG. 4 is a functional block diagram of a mini edge server of the embodiment of this disclosure.

With reference to FIG. 4, the mini edge server 266 includes: a node information DB 302 which stores information about each node in a network via which the vehicle 160 performs communication; a node information update unit 300 for updating the information stored in the node information DB 302, in accordance with sensor data, vehicle information, and infrastructure equipment information received from the outside; and a timer 312 for outputting a signal that instructs reconstruction of the mini edge server 266 in a constant cycle. Here, the reconstruction of the mini edge server 266 means re-determining the number of nodes from which the mini edge server 266 is to collect sensor data, and selecting nodes again, in accordance with changes in the surrounding environment due to travel of the vehicle and changes in a vehicle-inside state described later, and starting update of the information stored in the node information DB 302, on the basis of sensor data from these nodes. The nodes that are selected as described above and that are used by the mini edge server 266 are referred to as "cooperative nodes".

The mini edge server 266 further includes: a vehicle resource DB 310 for storing information about vehicle resources related to the vehicle 160 (capability of a later-described computer constituting the on-vehicle device 210, load of a CPU of the computer, memory pressure, communication speed, etc.); a node number determination unit 314 for determining the number of nodes with which the mini edge server 266 should communicate, on the basis of the vehicle resources stored in the vehicle resource DB 310, in order to reconstruct the mini edge server 266 in response to the signal from the timer 312; and a node determination unit 316 for determining which node to communicate with to receive sensor data and the like that are to be used for updating the mini edge server 266, on the basis of the number of cooperative nodes determined by the node number determination unit 314 and the node information stored in the node information DB 302, similarly, in order to reconstruct the mini edge server 266 in response to the signal from timer 312.

The mini edge server 266 further includes: a sub edge server 318 which realizes the function of the subset of the function provided by the edge server 62, on the basis of sensor data collected through communication with the cooperative nodes determined by the node determination unit 316, and outputs a subset of the driving support information outputted by the edge server 62; a sensor data buffer 320 for receiving and temporarily storing sensor data from the outside received from the vehicle inside-outside cooperation unit 264; an output determination unit 322 for transferring only driving support information that is not stored in the sensor data buffer, out of driving support information outputted by a sensor data analysis unit 352, to the autonomous driving ECU 272, the various ECUs 274, etc., via the on-vehicle GW 260.

The function provided through an analysis process by the edge server 62 is detection of the positions and attributes of dynamic objects as described above. The function of a subset of the analysis process provided by the sub edge server 318 refers to detection of the positions of dynamic objects in a limited range obtained from the cooperative nodes, and detection of a part of attributes detected through analysis by the edge server 62.

The sub edge server 318 includes: a sensor data collection unit 350 which collects sensor data from the nodes indicated by the node determination unit 316; and the sensor data analysis unit 352 which executes the subset of the analysis process performed by the edge server 62, on the sensor data collected by the sensor data collection unit 350, and which outputs an analysis result to the output determination unit 322.

Specifically, the reconstruction of the mini edge server means that the node number determination unit 314 determines the number of cooperative nodes and notifies the node determination unit 316 of the determined number of cooperative nodes, the node determination unit 316 determines cooperative nodes the number of which is equal to the number of cooperative nodes, and notifies the sensor data collection unit 350 of the determined cooperative nodes, the sensor data collection unit 350 starts collecting sensor data from the cooperative nodes notified by the node determination unit 316 instead of the previous cooperative nodes, and the sensor data analysis unit 352 executes the above subset of the analysis process on the sensor data newly started to be collected as described above, generates information to be stored in the node information DB 302, on the basis of the result, and starts update.

Here, with reference to FIG. 5, a method for determining the number of cooperative nodes by the node number determination unit 314, and a method for determining cooperative nodes by the node determination unit 316, shown in FIG. 4, will be described.

In general, the processing capability of the on-vehicle device 210 is much lower than that of the edge server 62. Therefore, the on-vehicle device 210 cannot process too much sensor data. For this reason, the node number determination unit 314 selects a certain number of cooperative nodes on the basis of: data on the vehicle-inside state such as the processing capability of the computer constituting the on-vehicle device 210, the present load, memory pressure, and a bottleneck for the transfer speed of a data relay path in an in-vehicle network; and data on a vehicle-outside state such as the line speed of communication with the vehicle outside and a predicted size of sensor data to be received. This number of cooperative nodes can be determined as a function of each of the above variables. The node number determination unit 314 determines the number of cooperative nodes on the basis of this function.

The node determination unit 316 determines cooperative nodes the number of which is equal to the number of nodes determined by the node number determination unit 314, among nodes with which the external communication device 262 can communicate, as described below.

Figure 5:
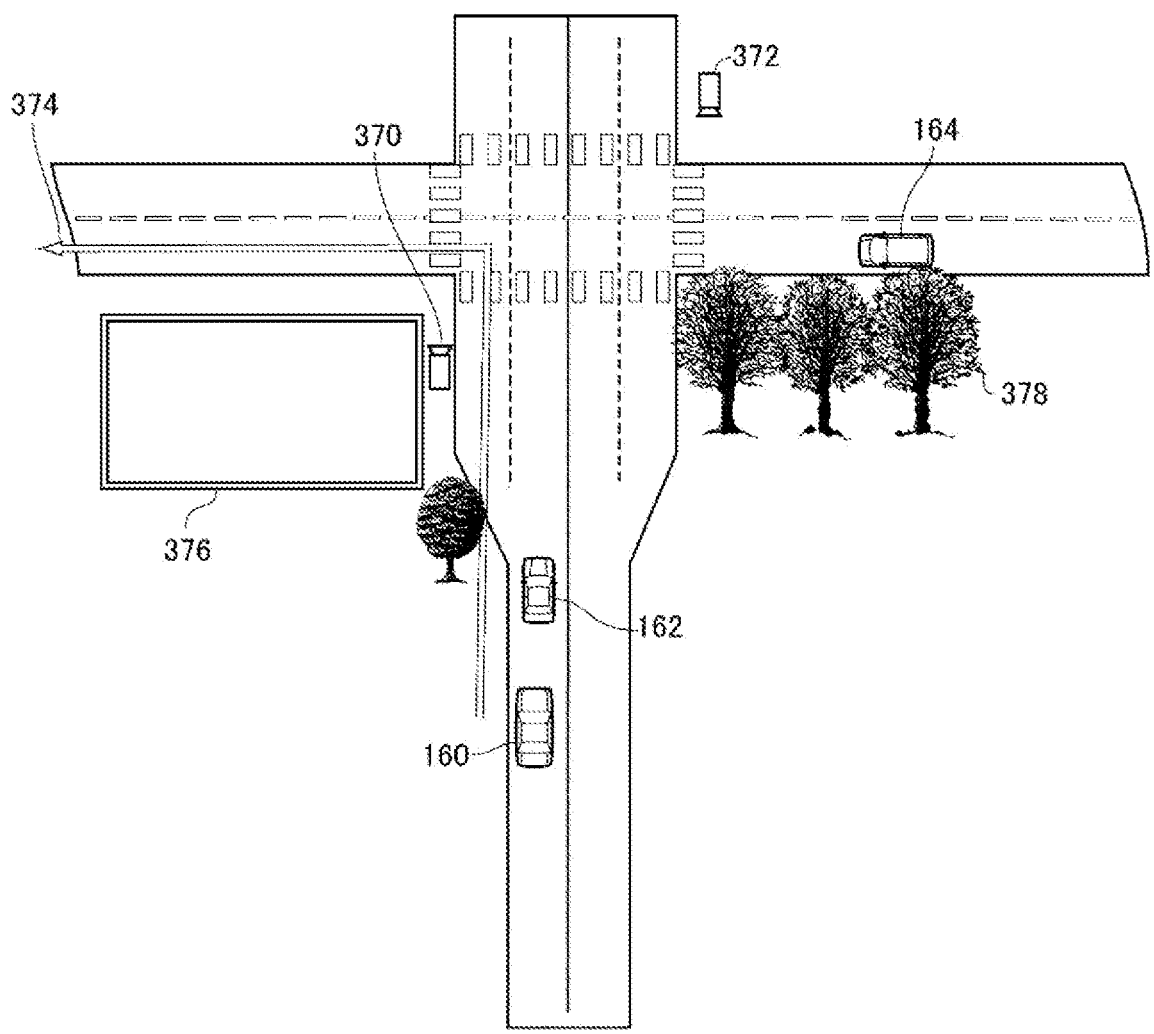
FIG. 5 is a schematic diagram for illustrating a method for selecting a cooperative node by the mini edge server according to the embodiment of this disclosure.

With reference to FIG. 5, the node number determination unit 314 reads, from the node information DB 302, information about infrastructure cameras 370 and 372 and the like that can communicate with the vehicle 160 and that are present in a region along a planned travel path 374 of the vehicle 160, and information about vehicles 162 and 164 and the like that are travelling on the planned travel path 374 in the same direction as the planned travel path 374 of the vehicle 160. Furthermore, the node determination unit 316 scores the detection ranges of sensor data of these sensors according to the following criteria: (1) give a higher score to a node that is an infrastructure sensor such as an infrastructure camera than a node that is a vehicle sensor; (2) give a higher score to a sensor having a detection range that is along the travelling direction of the vehicle 160, that has a larger portion that does not overlap with the detection range of the sensor of the vehicle 160, and that is closer to the detection range; and (3) give a higher score to a sensor including accident information (a sign of an accident or a post-accident site) in the detection range thereof.

The reason why a higher score is given to an infrastructure sensor is that an infrastructure sensor is generally installed in a place with good visibility such as a high place and the detection range of the sensor is wide.

In the case of the arrangement shown in FIG. 5, the vehicle 162, the infrastructure cameras 370 and 372, and the vehicle 164 are candidates for cooperative nodes. For example, when the number of cooperative nodes determined by the node number determination unit 314 is two, two candidates have to be selected from among these four candidates.

The infrastructure cameras 370 and 372 and the vehicle 162 each have a detection range that overlaps with the travelling direction of the vehicle 160, but a sensor (for example, an on-vehicle camera) included in the vehicle 162 is not an infrastructure sensor. The detection range of the infrastructure camera 372 along the planned travel path 374 of the vehicle 160 is narrower than the detection range of the infrastructure camera 370. Therefore, of these three, the infrastructure camera 370 is given a highest score, and the infrastructure camera 372 and the vehicle 162 are each given a low score. Meanwhile, the detection range of a sensor (for example, an on-vehicle camera) of the vehicle 164 has a large portion along the planned travel path 374 and a large portion that does not overlap with the detection range of the sensor of the vehicle 160 due to the presence of standing trees 378 and a building 376, etc. Therefore, the vehicle 164 is given a high score. Due to the above, in the case of FIG. 5, the infrastructure camera 370 and the vehicle 164 are selected as cooperative nodes.

The above scores can be calculated if the planned travel path 374 is determined, the detection ranges of the respective vehicle sensors and infrastructure sensors are known, and the range that cannot be seen from the vehicle 160 is known on the basis of a high-accuracy map.

Figure 6:
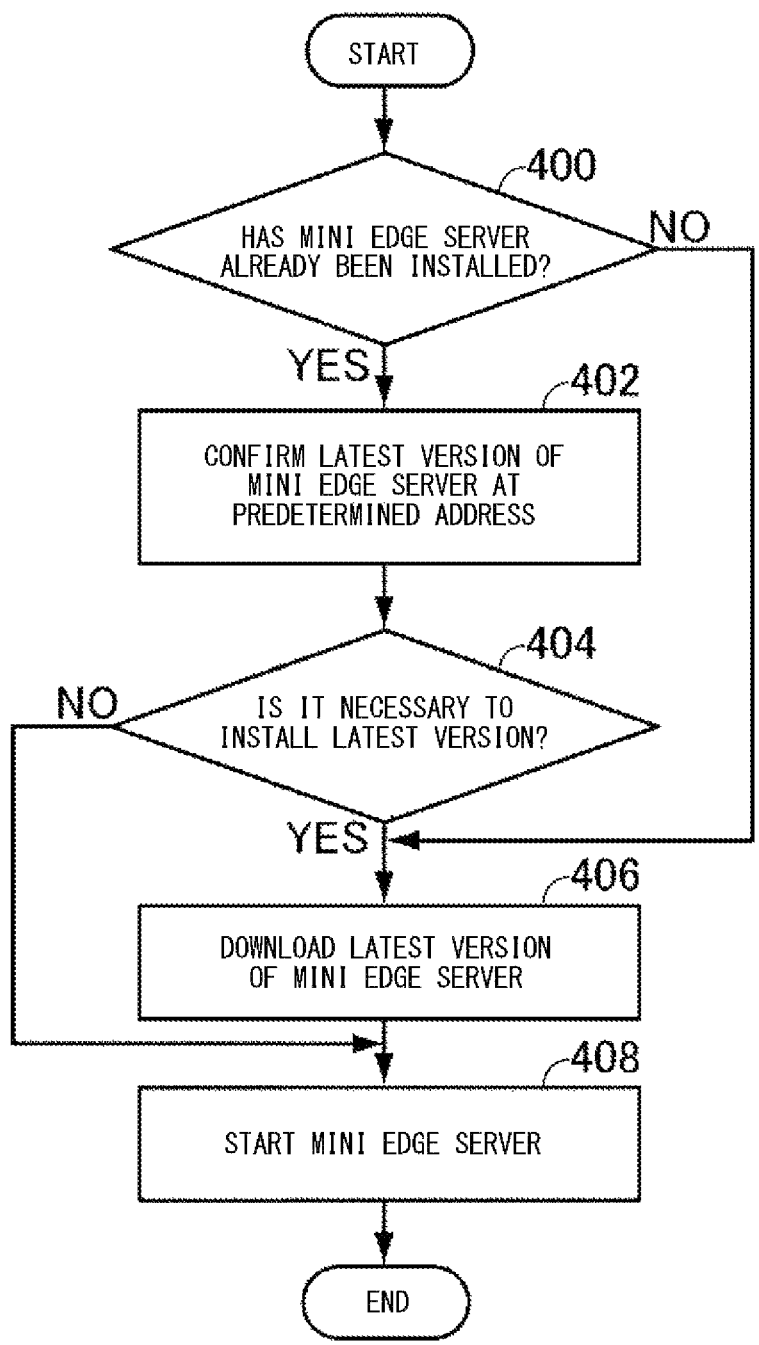
FIG. 6 is a flowchart showing the control structure of a program for installing the mini edge server shown in FIG. 4 into the on-vehicle device.

FIG. 6 is a flowchart showing the control structure of an installer program for installing the above mini edge server 266 into the on-vehicle device 210. The installer program can be started manually or can be started periodically. Alternatively, this program can be started every day when the vehicle is first started. Furthermore, when communication with the server is possible, this program may be started by an instruction from the server.

With reference to FIG. 6, this program includes: step 400 of determining whether the mini edge server has been installed in the on-vehicle device 210, simultaneously with start of this program; step 402 of, in response to the determination in step 400 being affirmative, accessing a predetermined address (for example, a URL specified by the edge server 62 or specified in advance by the seller of the vehicle) and confirming the latest version of the mini edge server; and step 404 of comparing the version of the program of the mini edge server installed in the on-vehicle device 210 with the version of the program of the mini edge server existing at the predetermined address, determining whether it is necessary to install the latest version of the program, and branching the flow of control in accordance with the determination.

This program further includes: step 406 of, in response to the determination in step 404 being affirmative, downloading the program of the mini edge server from the predetermined address, storing this program in an auxiliary storage device 528 (see FIG. 8) described later or the like, and installing this program into the on-vehicle device 210; and step 408 of starting the program of the mini edge server 266 installed in the on-vehicle device 210 and ending execution of this program, after execution of step 406 or when the determination in step 404 is negative.

Also, when the determination in step 400 in FIG. 6 is negative, the processes in steps 406 and 408 are executed. By using this program, even when the vehicle having this on-vehicle device mounted thereon cannot receive distribution information from the driving support server, the vehicle can enjoy driving support by starting the mini edge server, receiving sensor information from a surrounding node, and processing the sensor information with a sub driving support server inside the mini edge server.

Figure 7:
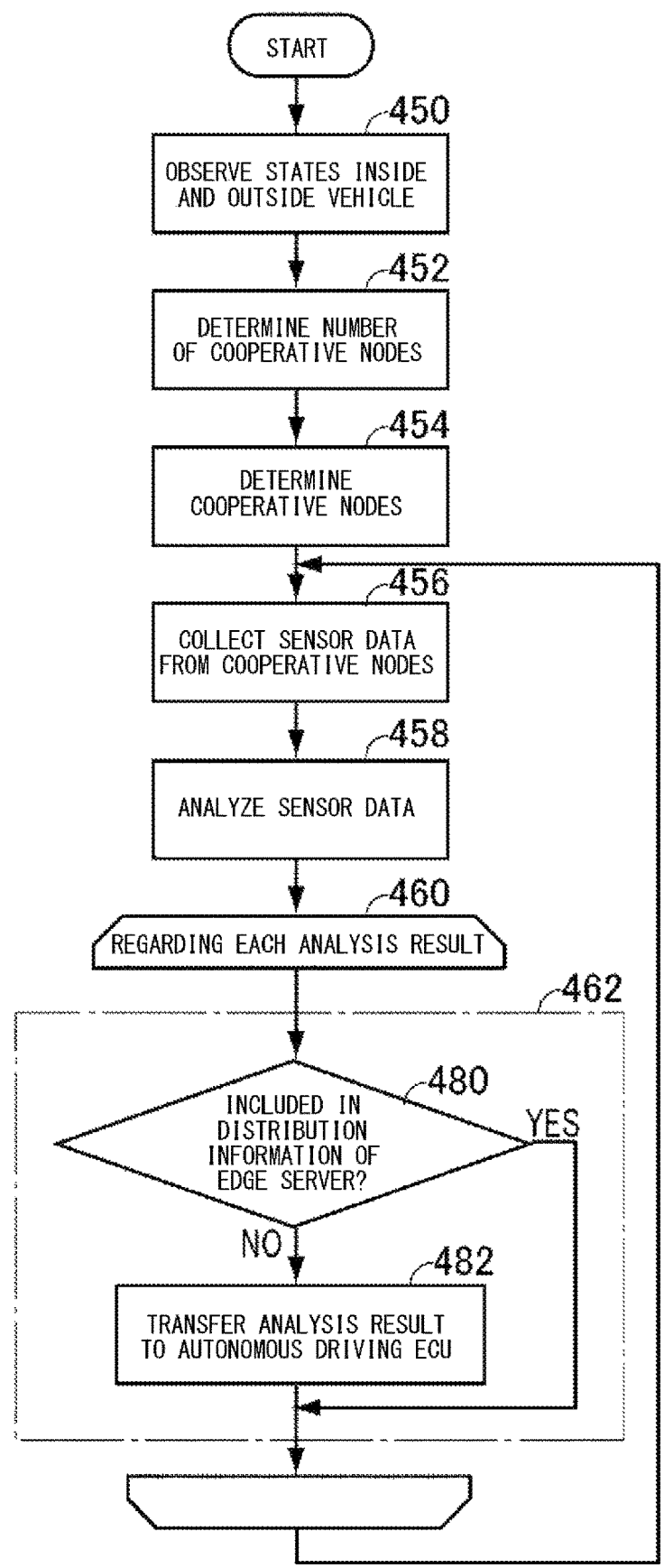
FIG. 7 is a flowchart showing the control structure of a program for causing a computer to function as the mini edge server shown in FIG. 4.

FIG. 7 is a flowchart showing the control structure of a program for starting the mini edge server according to the embodiment of this disclosure. This program is repeatedly started every certain period by the timer 312 shown in FIG. 4. At this time, the previously executed program is canceled.

With reference to FIG. 7, this program includes: step 450 of observing the states inside and outside the vehicle immediately after the start; step 452 of determining the number of cooperative nodes; and step 454 of determining cooperative nodes the number of which is equal to the number determined in step 452.

In step 450, with reference to the vehicle resource DB 310 shown in FIG. 4, data on the vehicle-inside state such as the processing capability of the computer constituting the on-vehicle device 210, the present load, memory pressure, and a bottleneck for the transfer speed of the data relay path in the in-vehicle network, and data on the vehicle-outside state such as the line speed of communication with the vehicle outside and a predicted size of sensor data to be received, are read.

In step 452, the number of cooperative nodes is determined in accordance with a predetermined function on the basis of the above information.

In step 454, information about nodes such as infrastructure sensors, vehicles, and the like with which the on-vehicle device 210 can communicate is read from the node information DB 302 shown in the drawing, and cooperative nodes are selected in accordance with the already-described criteria and the number of nodes determined in step 452.

This program further includes: step 456 of collecting sensor data from each of the cooperative nodes determined in step 452; and step 458 of analyzing the sensor data collected in step 456, by using the subset of the function of the edge server 62, and outputting a subset of information generated by the edge server 62. The process performed in step 458 is a subset of the processing of the edge server 62. Since the processing capability of the on-vehicle device 210 is lower than the processing capability of the edge server 62, only a part of the processing of the edge server 62 is executed. For example, the on-vehicle device 210 does not execute a complicated process that requires a large amount of calculation, such as a process of detecting the attribute of a mobile body.

This program further includes step 460 of executing the following process 462 on each of analysis results generated in step 458.

The process 462 includes step 480 of determining whether an analysis result to be processed is included in distribution information from the edge server 62, and ending the execution of the process 462 when the analysis result to be processed is included; and step 482 of, when the determination in step 480 is negative, transferring the analysis result to be processed to the autonomous driving ECU 272. In step 480, comparison with the distribution information from the edge server 62 stored in the sensor data buffer 320 shown in FIG. 4 is performed. When the edge server 62 is normally operating, the analysis result to be processed is also stored in the sensor data buffer. Therefore, the analysis result of the mini edge server 266 is not transferred to the autonomous driving ECU 272. However, when communication with the edge server 62 has been interrupted, the analysis result by the mini edge server 266 is not stored in the sensor data buffer and therefore is transferred to the autonomous driving ECU 272.

(Operation)

The on-vehicle device 210 described above operates as follows.

—Installation of Mini Edge Server 266—

For example, when the vehicle 160 (see FIG. 2) is started, the program shown in FIG. 6 is executed by the on-vehicle device 210. If the mini edge server 266 has already been installed, the determination in step 404 is performed from step 400 through step 402 in FIG. 6. If it is necessary to install the latest version, the program thereof is downloaded and installed into the on-vehicle device 210 in step 406. The program is started in step 408, and the mini edge server 266 starts processing.

If the latest version of mini edge server 266 has already been installed in the on-vehicle device 210, the program installation (step 406) is skipped, and the mini edge server 266 is started (step 408).

If the mini edge server 266 has not been installed in the on-vehicle device 210, the control proceeds from step 400 to step 406, and the program thereof is downloaded and installed into the on-vehicle device 210 in step 406. The program is started in step 408, and the mini edge server 266 starts processing.

Therefore, in this embodiment, the mini edge server 266 constantly operates in the background apart from the processing of the distribution information from the edge server 62. This processing is realized by a background processing function which is the basic function of the OS (Operating System) of the mini edge server.

—When Communication With Edge Server 62 is Normally Performed—

With reference to FIG. 3, when the on-vehicle device 210 normally receives the distribution information from the edge server 62, the distribution information is given to the autonomous driving ECU 272 via the external communication device 262, the vehicle inside-outside cooperation unit 264, and the on-vehicle GW 260. The autonomous driving ECU 272 controls each part of the vehicle 160 in accordance with this information. The distribution information is also given from the vehicle inside-outside cooperation unit 264 to the mini edge server 266. Information about nodes in this information is given to the node information update unit 300 and stored in the node information DB 302. The sensor data is given to the sensor data buffer and temporarily stored therein.

Meanwhile, the mini edge server 266 is periodically reconstructed. That is, the timer 312 shown in FIG. 4 periodically transmits a signal indicating that the mini edge server 266 is to be reconstructed, to the node number determination unit 314 and the node determination unit 316. In response to this signal, the node number determination unit 314 determines the number of cooperative nodes by using the information stored in the vehicle resource DB 310. In response, the node determination unit 316 determines cooperative nodes the number of which is equal to the number determined by the node number determination unit 314, by the above-described method in accordance with the node information stored in the node information DB 302, and indicates the determined cooperative nodes to the sensor data collection unit 350 of the sub edge server 318.

The sensor data collection unit 350 collects sensor data from the nodes indicated by the node determination unit 316, and gives the collected sensor data to the sensor data analysis unit 352. The sensor data analysis unit 352 executes the subset of the analysis process performed by the edge server 62, on the collected sensor data, and outputs an analysis result including the detection of the positions of dynamic objects existing in a limited range and a part of the attributes of the dynamic objects. The output determination unit 322 determines whether the analysis result outputted by the sensor data analysis unit 352 exists in the sensor data buffer 320. If communication between the edge server 62 and the on-vehicle device 210 is normal, the output of the sensor data analysis unit 352 is also stored in the sensor data analysis unit 352. Therefore, the output determination unit 322 does not transfer the analysis result of the sensor data analysis unit 352 to the autonomous driving ECU 272.

When the flow of control is shown by the flowchart of FIG. 7, after the processes from step 450 to step 458 are executed, the process 462 is executed on each analysis result in step 460. In the process 462, the determination in step 480 is constantly affirmative. Therefore, the process in step 482 is not executed. That is, the analysis result of the sensor data analysis unit 352 is not distributed to the autonomous driving ECU 272, and the autonomous driving ECU 272 operates in accordance with the distribution information from the edge server 62.

—When Communication With Edge Server 62 is not Normally Performed—

When, for some reason, the on-vehicle device 210 cannot receive the distribution information from the edge server 62, the on-vehicle device 210 operates as follows. Even in this case, the operation of the mini edge server 266 is basically the same as when communication with the edge server 62 is normally performed. The difference is that the contents of the sensor data buffer shown in FIG. 4 are not updated since the distribution information from the edge server 62 cannot be received. As a result, when the analysis result of the sensor data analysis unit 352 is outputted, the same information has not been stored in the sensor data buffer. Therefore, the output determination unit 322 transfers the analysis result of the sensor data analysis unit 352 to the autonomous driving ECU 272. The autonomous driving ECU 272 controls each part of the vehicle 160 in accordance with the analysis result of the sensor data analysis unit 352.

Considering the flowchart of FIG. 7, the processes from step 450 to step 458 are the same as when communication with the edge server 62 is normally performed. The difference is that the determination in step 480 is negative. As a result, the analysis result of the sensor data analysis unit 352 is transferred to the autonomous driving ECU 272 in step 482.

(Realization by Computer)

Figure 8:
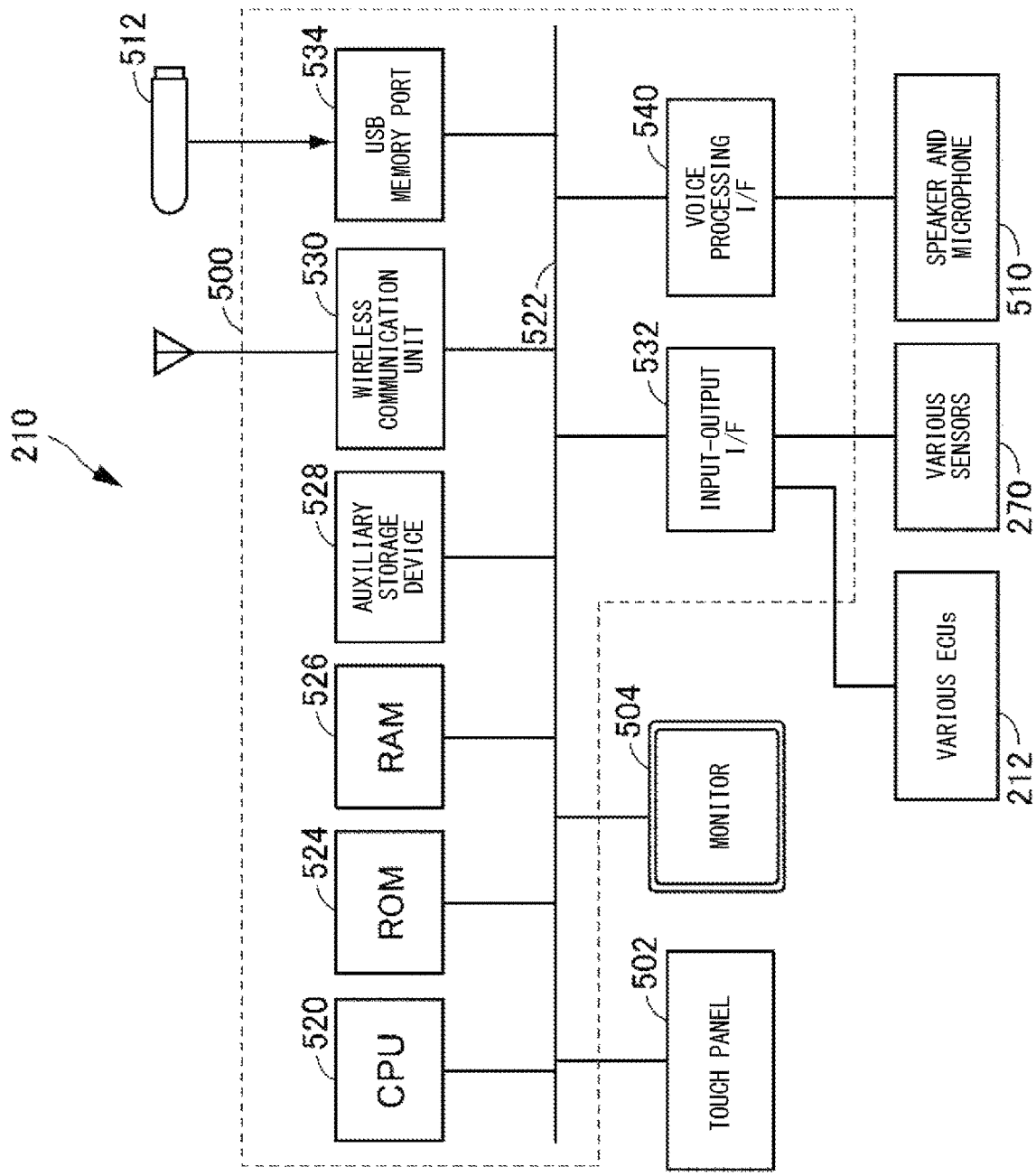
FIG. 8 is a block diagram showing a schematic hardware configuration of a computer for realizing the function of the on-vehicle device shown in FIG. 4.

With reference to FIG. 8, the on-vehicle device 210 is substantially a processor including a computer 500, and includes a CPU (Central Processing Unit) 520 and a bus 522 serving as a transmission path for data and commands between the CPU 520 and each part inside the computer 500. The computer 500 further includes: the non-volatile auxiliary storage device 528 which includes a ROM (Read-Only Memory) 524, a RAM (Random Access Memory) 526, a hard disk or an SSD (Solid State Drive), etc., all connected to the bus 522; a wireless communication unit 530 which provides communication with the outside by wireless communication; an input-output interface (I/F) 532 which is connected to the bus 522; a voice processing I/F 540 for providing interaction with a user by voice; and a USB memory port 534 to and from which a USB memory 512 is attachable and detachable and which allows communication between the USB memory 512 and the other parts inside the computer 500.

The on-vehicle device 210 further includes a touch panel 502 connected to the bus 522, and a monitor 504 connected to the bus 522, such as a liquid crystal display including a display control device.

The above-described autonomous driving ECU 272, various ECUs 274, and various sensors 270 are connected to the input-output I/F 532. A speaker and microphone 510 are connected to the voice processing I/F 540. A start program of the computer 500, etc., are stored in the ROM 524. The RAM 526 is used as a work area for storing various variables during processing by the CPU 520.

In the above first embodiment of the disclosure, the node information DB 302, the vehicle resource DB 310, and the sensor data buffer shown in FIG. 4, and a storage unit that is not shown and that is for the sensor data collected by the sensor data collection unit 350 are each realized by the auxiliary storage device 528 or the RAM 526 shown in FIG. 8. Typically, these are stored in the RAM 526 when the on-vehicle device 210 is operating, and are periodically stored as backups in the auxiliary storage device 528.

A computer program for causing the computer 500 to operate as the on-vehicle device 210 and the functions of the components thereof is stored in the USB memory 512. The USB memory 512 is attached to the USB memory port 534, and this program is transferred to the auxiliary storage device 528. Alternatively, this program may be transmitted from another computer to the computer 500 via a network, which is not shown, through wireless communication by the wireless communication unit 530, and may be stored in the auxiliary storage device 528.

The program is loaded into the RAM 526 when being executed. The CPU 520 reads the program from the RAM 526 in accordance with an address indicated by a register (not shown) called a program counter inside the CPU 520, interprets a command, reads the data required for executing the command, from the RAM 526, the auxiliary storage device 528, or another device such as the input-output I/F 532 and the voice processing I/F 540 in accordance with an address specified by the command, and executes the command. The CPU 520 stores data of an execution result at an address specified by the program, such as the RAM 526, the auxiliary storage device 528, and the register inside the CPU 520. The computer program may be loaded directly into the RAM 526 from the USB memory 512 or via a network.

The program that realizes each function of the on-vehicle device 210 includes a plurality of commands for causing the computer 500 to operate as the mini edge server 266 according to the embodiment of this disclosure, and a plurality of commands for installing the mini edge server 266 into the computer 500. Some of the basic functions required to perform this operation are provided by the operating system (OS) running on the computer 500, a third-party program, or modules of various toolkits installed in the computer 500. Therefore, this program does not necessarily have to include all the functions required to realize the system and method of this embodiment. It is sufficient that this program includes only commands for executing the above-described operation as the mini edge server 266 and the components thereof in a manner controlled such that a desired result is obtained, by calling an appropriate function or "programming tool kit" in the commands.

In this embodiment, the mini edge server 266 is periodically reconstructed, and constantly operates in the background regardless of whether communication with the edge server 62 is normally performed. When the distribution information from the edge server 62 is normally received, the analysis result by the mini edge server 266 is not used for driving support such as vehicle control. Only when the distribution information from the edge server 62 can no longer be received, the analysis result by the mini edge server 266 is used for driving support instead of the distribution information from the edge server 62.

The analysis result by the mini edge server 266 is a subset of the analysis result by the edge server 62, and is generated on the basis of information from nodes that is effective for driving support of the vehicle, albeit in a limited range. Therefore, even when a situation in which communication between the on-vehicle device 210 and the edge server 62 cannot be temporarily performed occurs, the vehicle can seamlessly use the analysis result by the mini edge server 266, and can enjoy effective driving support. The analysis result by the mini edge server 266 is just a subset for distribution by the edge server 62, and does not provide all the attributes provided through analysis by the edge server 62, for example. Therefore, the edge server 62 cannot be completely replaced with the mini edge server 266. However, by setting the processing function of the mini edge server 266 as a subset that is particularly required in the processing function of the edge server 62, and detecting required attributes, effective driving support can be provided to the on-vehicle device 210 even when the distribution information from the edge server 62 cannot be obtained.

Moreover, when communication with the edge server 62 is recovered, the output determination unit 322 (see FIG. 4) of the mini edge server 266 suppresses the output of the mini edge server 266, so that it is possible to seamlessly return to the processing based on the update information of the edge server 62.

In the above embodiment, when nodes are selected, each node is scored in accordance with a certain criterion, and nodes with a high score are selected. However, this disclosure is not limited to such an embodiment. For example, a predetermined number of nodes may be merely selected in order from one having the smallest distance from the own vehicle. Alternatively, among nodes existing along the traveling direction of the own vehicle, those having a smaller distance from the own vehicle may be selected in order. Furthermore, among nodes existing along a planned traveling direction of the own vehicle, those having a smaller distance from the own vehicle may be selected in order, excluding those having a largely overlapping detection range. In addition to the above, various criteria can be considered as the node selection criteria.

Second Embodiment

In the above first embodiment, the mini edge server 266 constantly operates and is periodically reconstructed by the timer 312. However, this disclosure is not limited to such an embodiment. The mini edge server may be reconstructed only when the surrounding situation changes. A second embodiment relates to such a mini edge server.

Figure 9:
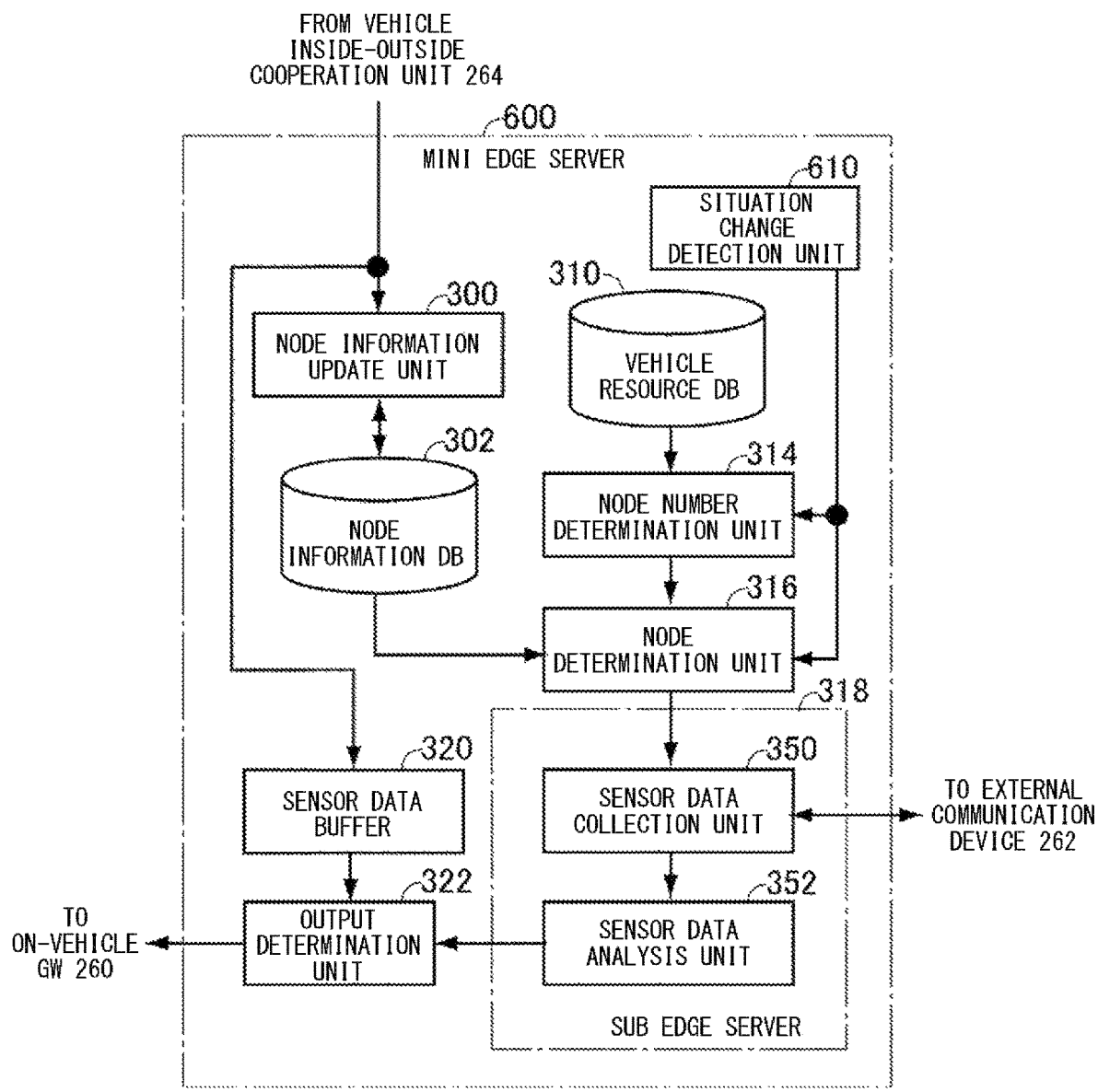
FIG. 9 is a block diagram showing a functional configuration of a mini edge server according to a second embodiment of this disclosure.

FIG. 9 shows a block diagram of a mini edge server 600 according to the second embodiment of this disclosure. With reference to FIG. 9, the mini edge server 600 is different from the mini edge server 266 shown in FIG. 4, in, instead of the timer 312 in FIG. 4, including a situation change detection unit 610 which is connected to the node information DB 302 and which is for outputting a signal to instruct the node number determination unit 314 to determine the number of nodes, to the node number determination unit 314 in order to reconstruct the mini edge server 600, when the node information stored in the node information DB 302 changes (for example, when a new node is added or a node is deleted).

As for the other points, the mini edge server 600 is the same as the mini edge server 266 according to the first embodiment.

Moreover, the operation of the mini edge server 600 is the same as that of the mini edge server 266 except for when to reconstruct the mini edge server 600. In the mini edge server 266, when information about surrounding nodes is distributed from the edge server 62, the node information update unit 300 receives this information and updates the node information DB 302 with the new information. When a node is added or deleted, the situation change detection unit 610 detects the addition or deletion, and gives a signal to instruct the node number determination unit 314 to determine the number of nodes, to the node number determination unit 314. In response to this signal, the node number determination unit 314 determines a new number of nodes, and the node determination unit 316 selects nodes the number of which is equal to the number determined by the node number determination unit 314, as cooperative nodes on the basis of the node information stored in the node information DB 302.

The subsequent operation of the mini edge server 600 is the same as that of the mini edge server 266 according to the first embodiment.

According to this embodiment, the mini edge server is not periodically reconstructed, but is reconstructed only when the node information (network configuration) changes. For example, when the node configuration changes frequently such as in an urban area, the mini edge server operates in the same manner as in the first embodiment, but, for example, when the vehicle is running stably on a highway and there is little change in the surrounding vehicle configuration, the frequency of reconstruction of the mini edge server is decreased, and the same advantageous effects as those of the first embodiment can be obtained while reducing the load on the computer.

When the mini edge server is frequently reconstructed due to frequent change in the node information in a short period of time, a minimum time from reconstructing the mini edge server to the next reconstruction may be set. Alternatively, reconstruction of the edge server may be started when changes in the node information are accumulated to some extent. Furthermore, the cooperative node selection may be performed only when there is a change in the surrounding situation, and collection of sensor data from the cooperative nodes and the determination as to whether to transfer an analysis result to the ECU or the like may be performed periodically in a shorter cycle than the cooperative node selection.

As described above, according to this disclosure, even when the on-vehicle device can no longer receive the distribution information from the edge server or the like, information for vehicle support can be obtained on the basis of sensor data from nodes around the on-vehicle device. By appropriately setting the analysis function of the mini edge server, it is possible to appropriately perform driving support of the vehicle even while the distribution information from the edge server or the like cannot be received. Switching between the distribution information from the edge server and the analysis result of the mini edge server is seamlessly performed, so that the driver is not bothered.

In the above disclosure, the mini edge server constantly operates in the background. If the mini edge server operates in the background as described above, when the distribution information from the edge server is no longer received, the analysis result of the mini edge server can be used seamlessly, which is convenient for driving support. However, this disclosure is not limited to such an embodiment. For example, the mini edge server may not necessarily be operated in the background, and when the distribution information from the edge server is no longer received, the mini edge server may be started and reconstructed. In this case, the execution of the mini edge server is ended when reception of the distribution information from the edge server is recovered.

Such an implementation eliminates the load due to the mini edge server being constantly operating in the background, which is convenient especially when there is not much margin in the capability of the computer that realizes the on-vehicle device. Moreover, even in the case where the capability of the computer is considerably high, and the mini edge server is caused to operate in the background, when the load on the on-vehicle device is high due to other processing, the operation of the mini edge server may be stopped.

The embodiments disclosed herein are merely illustrative in all aspects and should be considered not restrictive. The scope of this disclosure is defined by the scope of the claims rather than the detailed description of the disclosure, and is intended to include meaning equivalent to the scope of the claims and all modifications within the scope.

REFERENCE SIGNS LIST 50 driving support system
60, 64, 68 wireless base station
62, 66, 70 edge server
80 backhaul 82 core network
90, 94, 98 camera
92, 96, 100, 204 LiDAR
110, 112, 114 area
120, 124, 126, 128, 130 optical fiber
122 metal wire
140, 160, 162, 164 vehicle
200 millimeter-wave radar
202 on-vehicle camera
210 on-vehicle device
212, 274 various ECUs
230 other vehicle
232 infrastructure equipment
260 on-vehicle GW
262 external communication device
264 vehicle inside-outside cooperation unit
266, 600 mini edge server
270 various sensors
272 autonomous driving ECU
300 node information update unit
302 node information DB
310 vehicle resource DB
312 timer
314 node number determination unit
316 node determination unit
318 sub edge server
320 sensor data buffer
322 output determination unit
350 sensor data collection unit
352 sensor data analysis unit
370, 372 infrastructure camera
374 planned travel path
376 building
378 standing tree
400, 402, 404, 406, 408, 450, 452, 454, 456, 458, 460, 480, 482 step
462 process
500 computer
502 touch panel
504 monitor
510 speaker and microphone
512 USB memory
520 CPU
522 bus
524 ROM
526 RAM
528 auxiliary storage device
530 wireless communication unit
532 input-output OF
534 USB memory port
540 voice processing I/F
610 situation change detection unit

The invention claimed is:

1. An on-vehicle device comprising:
a driving support device mounted in a vehicle, and configured to receive driving support information from a driving support server and execute a predetermined process for driving support;
a sub driving support server mounted in the vehicle, and including a subset of a function of the driving support server and configured to receive sensor data from an external sensor and generate a subset of the driving support information based on the received sensor data and output the generated subset of the driving support information;
a first switching device configured to give the subset of the driving support information from the sub driving support server, instead of the driving support information from the driving support server, to the driving support device in response to interruption of reception of the driving support information from the driving support server;
a second switching device configured to give the driving support information from the driving support server, instead of the subset of the driving support information from the sub driving support server, to the driving support device in response to recovery of the reception of the driving support information from the driving support server;
a state storage device that stores states inside and outside the on-vehicle device and a cooperative state with another sensor-equipped device on the basis of the driving support information; and
a server reconstruction device that is mounted in the vehicle and is configured to reconstruct the sub driving support server in response to a change in either the states inside and outside the on-vehicle device or the cooperative state with the other sensor-equipped device stored by the state storage device.

2. The on-vehicle device according to claim 1, wherein the sub driving support server includes:
a computer; and
a storage device for storing a program to be executed by the computer, and
the on-vehicle device further comprises an installer for installing a program for realizing the sub driving support server in the computer, into the storage device in response to an installation instruction from the sub driving support server.

3. The on-vehicle device according to claim 1, wherein the server reconstruction device is configured to reconstruct the sub driving support server at a predetermined time interval.

4. The on-vehicle device according to claim 1, further comprising a background processing execution device for starting the sub driving support server with start of the on-vehicle device and causing the sub driving support server to operate in background of the reception of the driving support information from the driving support server.

5. The on-vehicle device according to claim 1, wherein the sub driving support server is set not to start when the on-vehicle device is started, and
the on-vehicle device further comprises a server start device for starting the sub driving support server in response to interruption of the reception of the driving support information from the driving support server.

6. A vehicle comprising:
the on-vehicle device according to claim 1; and
a vehicle control device to be supported by the driving support device.

7. A control method for an on-vehicle device, comprising the steps of:
controlling a computer that is mounted in a vehicle to receive driving support information from a driving support server, and execute a process of giving the driving support information to a driving support device that is configured to execute a predetermined process for driving support, the computer including a subset of a function of the driving support server;
receiving sensor data from an external sensor, and starting a sub driving support server that is mounted in the vehicle and configured to generate a subset of the driving support information based on the received sensor data, and output the generated subset of the driving support information;

the computer starting a process of giving the subset of the driving support information from the sub driving support server, instead of the driving support information from the driving support server, to the driving support device in response to interruption of reception of the driving support information from the driving support server;

the computer restarting a process of giving the driving support information from the driving support server, instead of the subset of the driving support information from the sub driving support server, to the driving support device in response to recovery of the reception of the driving support information from the driving support server;

the computer storing, to a state storage device, states inside and outside the on-vehicle device and a cooperative state with another sensor-equipped device on the basis of the driving support information; and the computer reconstructing the sub driving support server in response to a change in either the states inside and outside the on-vehicle device or the cooperative state with the other sensor-equipped device stored by the state storage device.

8. An on-vehicle device comprising at least one computer with a processor that is mounted in a vehicle that is configured to:

receive driving support information from a driving support server, and execute a process of giving the driving support information to a driving support device that is configured to execute a predetermined process for driving support, the computer including a subset of a function of the driving support server;

receive sensor data from an external sensor, and start a sub driving support server that is mounted in the vehicle and configured to generate a subset of the driving support information based on the received sensor data, and output the generated subset of the driving support information;

start a process of giving the subset of the driving support information from the sub driving support server, instead of the driving support information from the driving support server, to the driving support device in response to interruption of reception of the driving support information from the driving support server;

restart a process of giving the driving support information from the driving support server, instead of the subset of the driving support information from the sub driving support server, to the driving support device in response to recovery of the reception of the driving support information from the driving support server;

the computer storing, to a state storage device, states inside and outside the on-vehicle device and a cooperative state with another sensor-equipped device on the basis of the driving support information; and the computer reconstructing the sub driving support server in response to a change in either the states inside and outside the on-vehicle device or the cooperative state with the other sensor-equipped device stored by the state storage device.

* * * * *